US008254975B2

(12) United States Patent
Kroth et al.

(10) Patent No.: US 8,254,975 B2
(45) Date of Patent: Aug. 28, 2012

(54) METHOD FOR UPLINK ACCESS TRANSMISSIONS IN A RADIO COMMUNICATION SYSTEM

(75) Inventors: Norbert Kroth, Potsdam (DE); David Randall, Romsey (GB); Agnes Revel, Totton (GB); Jörg Schniedenharn, Bonn (DE)

(73) Assignee: Siemens Aktiengesellschaft, Munich (DE)

( * ) Notice: Subject to any disclaimer, the term of this patent is extended or adjusted under 35 U.S.C. 154(b) by 1461 days.

(21) Appl. No.: 10/534,380

(22) PCT Filed: Nov. 7, 2003

(86) PCT No.: PCT/EP03/12472
§ 371 (c)(1),
(2), (4) Date: Jan. 17, 2006

(87) PCT Pub. No.: WO2004/043099
PCT Pub. Date: May 21, 2004

(65) Prior Publication Data
US 2006/0154680 A1    Jul. 13, 2006

(30) Foreign Application Priority Data

Nov. 7, 2002   (GB) .................................. 0225903.4

(51) Int. Cl.
*H04B 7/00*   (2006.01)
(52) U.S. Cl. ........ 455/515; 455/434; 455/517; 455/423; 370/335; 370/336; 370/337; 370/328; 370/348
(58) Field of Classification Search .................. 455/515, 455/69, 517, 512, 67.1, 456–456.4; 370/337, 370/252, 329, 342
See application file for complete search history.

(56) References Cited

U.S. PATENT DOCUMENTS
5,828,663 A   10/1998   Ikegami
(Continued)

FOREIGN PATENT DOCUMENTS
EP            0994603 A2    4/2000
(Continued)

OTHER PUBLICATIONS

ETSI TS 122 146 V5.2.0 (Mar. 2002), Universal Mobile Telecommunications System (UMTS); Multimedia Broadcast/Multicast Service (MBMS); Stage 1 (3GPP TS 22.146 Version 5.2.0 Release 5); pp. 1-15.

*Primary Examiner* — Kiet Doan
*Assistant Examiner* — Michael T Vu
(74) *Attorney, Agent, or Firm* — Staas & Halsey LLP

(57) ABSTRACT

According to a first aspect, there is provided a method for controlling uplink access transmissions in a radio communication system, wherein a user equipment determines a delay time for transmitting a signal on an uplink access channel, wherein the delay time is randomly determined based upon a probability distribution that increases in density with increasing delay. According to a second aspect, there is provided a method for controlling uplink access transmissions in a radio communication system, wherein from a base station of the radio communication system, time variable information is signalled in downlink to user equipments located in an area covered by the base station, wherein the information is used to determine delay times for transmitting signals on an uplink access channel and wherein the information varies based upon a probability distribution which increases in density with increasing time.

20 Claims, 7 Drawing Sheets

U.S. PATENT DOCUMENTS

| | | | |
|---|---|---|---|
| 5,883,887 A * | 3/1999 | Take et al. | 370/329 |
| 6,075,779 A * | 6/2000 | Agarwal et al. | 370/337 |
| 6,078,572 A * | 6/2000 | Tanno et al. | 370/335 |
| 6,477,373 B1 | 11/2002 | Rappaport et al. | |
| 6,490,645 B1 * | 12/2002 | Shahaf et al. | 710/244 |
| 6,493,540 B1 * | 12/2002 | Suzuki | 455/67.11 |
| 6,690,661 B1 * | 2/2004 | Agarwal et al. | 370/337 |
| 7,145,897 B2 * | 12/2006 | Sachs et al. | 370/350 |
| 7,233,577 B2 * | 6/2007 | Choi et al. | 370/252 |
| 2003/0119452 A1 * | 6/2003 | Kim et al. | 455/69 |

FOREIGN PATENT DOCUMENTS

| | | |
|---|---|---|
| JP | 6-334587 | 12/1994 |
| JP | 9-261255 | 10/1997 |
| WO | WO 99/55113 | 10/1999 |
| WO | WO00/13426 | 3/2000 |
| WO | WO 00/32000 | 6/2000 |

* cited by examiner

METHOD FOR UPLINK ACCESS TRANSMISSIONS IN A RADIO COMMUNICATION SYSTEM

CROSS REFERENCE TO RELATED APPLICATIONS

This application is based on and hereby claims priority to PCT Application No. PCT/EP2003/012472 filed on Nov. 7, 2003 and United Kingdom Application No. 0225903.4 filed on Nov. 7, 2002, the contents of which are hereby incorporated by reference.

BACKGROUND OF THE INVENTION

The invention relates to a method for controlling uplink access transmissions in a radio communication system, especially in a mobile communication system.

In radio communication systems, signals are exchanged between radio terminals and base stations via a so called radio interface or air interface. Such radio terminals are for example mobile or stationary user equipments (UE). On the other side, base stations (NB—Node B) are access stations associated with a land based communication network. Examples of known radio communication systems are second generation digital mobile radio communication systems like GSM (Global System for Mobile Communication) based on TDMA (Time Division Multiple Access) and providing data rates up to 100 kbit/s, or third generation digital mobile radio communication systems like UMTS (Universal Mobile Telecommunication System) based on CDMA (Code Division Multiple Access) with data rates up to 2 Mbit/s.

In such communication systems, for the establishment of specific services it may be necessary or at least desirable to know the number of all user equipments or only those with particular characteristics which are currently located in a cell of a base station. One method of implementing such a process in case the network has no prior knowledge of the user equipments' presence in the cell, is for the network to request the user equipments to respond to the request on a contention based common uplink access channel, for example on a random access channel (RACH) known from the GSM and UMTS systems mentioned above. This enables the network to count the number of responses received from the addressed user equipments until a predetermined number (threshold) is reached, or, if less than the threshold number of user equipments are situated in the cell, until a predetermined time interval has lapsed. As a negative consequence, if a large number of user equipments is situated in the cell, this could lead to a signalling overload situation in the common uplink signalling channel, with the consequence of risking disruptions to the network's normal operation in the cell.

A particular example of where this problem may occur is the so called MBMS (Multimedia Broadcast/Multicast Service) service provision which is currently standardised to for UMTS and GSM/GERAN. Radio bearers for multicast MBMS services are set up within a cell only if there are user equipments present in the cell with the particular MBMS service activated. If the number present is below a threshold value, individual radio bearers are established to each of the user equipments (point-to-point bearers) whilst if the number exceeds the threshold value, a single multicast radio bearer is established to serve all user equipments present in the cell.

Consequently, the network needs to know whether the number of user equipment present in the cell exceeds the threshold and eventually, if less than the threshold number are present, the identities of the user equipments in order to build up individual bearers. For user equipments which are in the so called UMTS connected mode, the network knows the total number of user equipments present in the cell with the particular MBMS service activated without communicating directly with the user equipments. In contrast thereto, for user equipments which are in an unconnected state, e.g. in a so called idle mode or URA_PCH state, the network needs to signal a request to the user equipments, e.g. by paging or control channel signalling, and the user equipments will need to respond on the RACH (Random Access Channel) common uplink signalling channel. Counting of user equipment responses should be completed within a predetermined time interval, and a decision whether or not a single multicast radio bearer is established based on the result of the counting.

In current radio communication systems, access signalling on contention access channels like the RACH is controlled individually by the user equipments by selecting an initial delay period after which, when lapsed, the user equipment transmits access signals. This initial delay may be uniformly distributed, like in GSM, or effectively negative exponentially distributed, like in UMTS. Such initial delay distributions are well suited for responses to selective paging of individual user equipments, where simultaneous access attempts from a large number of user equipments are unlikely. However, they would not be efficient in preventing the occurrence of signalling overload in contention based access channels when a great number of user equipments is paged simultaneously as would be the case for a group page for establishing MBMS services.

SUMMARY OF THE INVENTION

It is therefore one possible object of the invention to provide a contention access control mechanism which enables a counting process to be completed whilst reducing the probability of overload in the uplink signalling channel used.

According to a first aspect of the invention, there is provided a method for controlling uplink access transmissions in a radio communication system, wherein a user equipment determines a delay time for transmitting a signal on an uplink access channel, wherein the delay time is randomly determined based upon a probability distribution that increases in density with increasing delay.

According to a second aspect of the invention, there is provided a method for controlling uplink access transmissions in a radio communication system, wherein from a base station of the radio communication system, time variable information is signalled in downlink to user equipments located in an area covered by the base station, wherein the information is used to determine delay times for transmitting signals on an uplink (UL) access channel (RACH) and wherein the information varies based upon a probability distribution which increases in density with increasing time.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
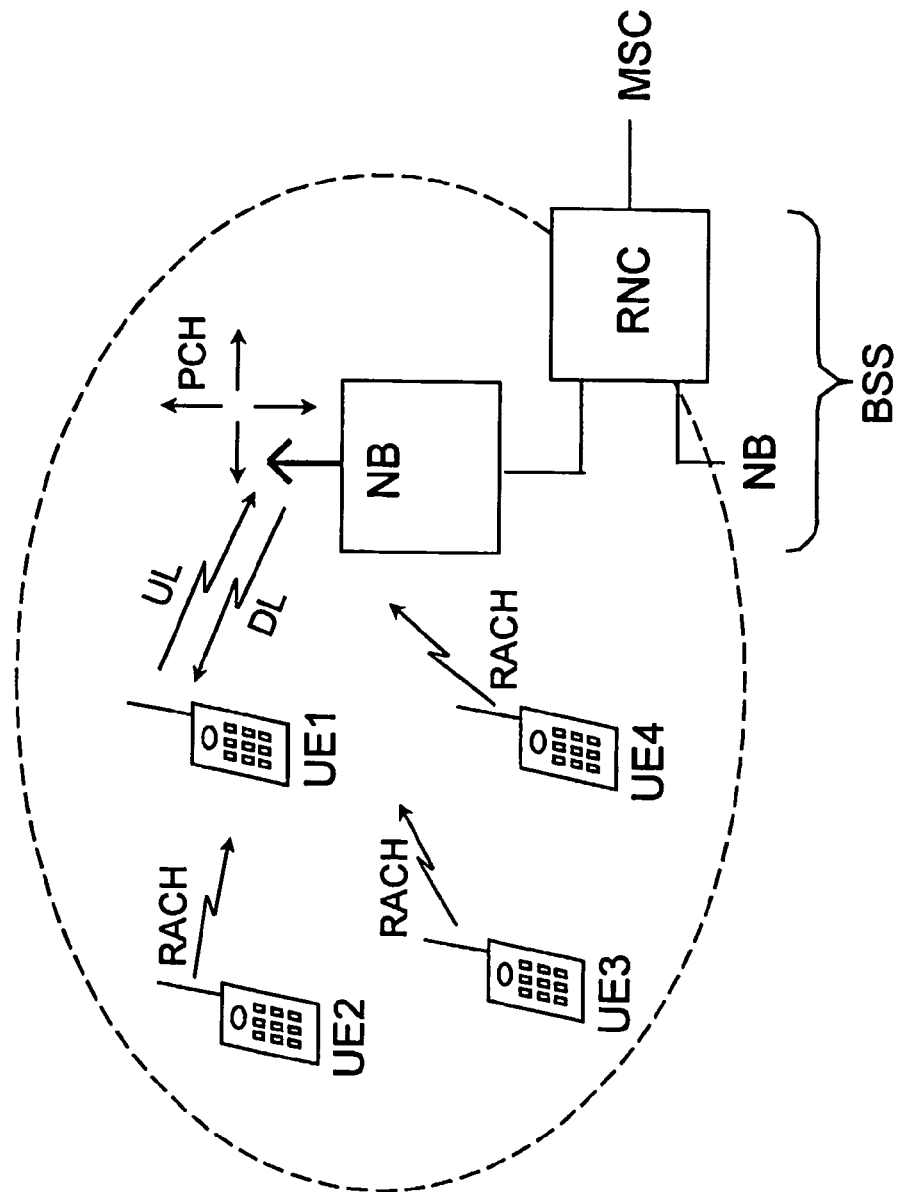
FIG. 1 shows a block diagram of a radio communication network.

Reference will now be made in detail to the preferred embodiments of the present invention, examples of which are illustrated in the accompanying drawings, wherein like reference numerals refer to like elements throughout.

FIG. 1 shows a block diagram of the basic structure of a UMTS mobile radio communication system. Such system has a central mobile switching center MSC which is connected to the public switched telephone network PSTN and other MSCs. Connected to a MSC is a plurality of radio network controllers RNC, which inter alia coordinate the sharing of radio resources provided by base stations NB (Node B). Base stations NB transmit in a downlink DL direction and receive in an uplink UL direction signals respectively to or from user equipments UE situated within the area (cell) covered by the base station NB with radio resources. In FIG. 1, base station NB transmits a request for the activation of an MBMS multicast service on a paging channel PCH to user equipments UE1 . . . UE4 located in its cell. User equipments, in the example of FIG. 1 UE2 . . . UE4, interested in the announced MBMS service and/or featuring particular characteristics to receive the service respond to the received request by transmitting access messages on the contention based access channel RACH.

The contention access control scheme according to the first aspect of the invention makes use of the following approaches.

Before responding to a request from the network, received for example in form of a page on a paging channel PCH or as a message on another control channel, by transmitting on a common uplink contention access channel, for example the RACH, the individual user equipment determines an initial delay time. The delay time is selected at random using a probability distribution that increases in density with increasing delay within a time interval of length T. One important advantage of such a distribution is that the likelihood of response messages from different user equipments colliding is reduced, thereby facilitating the counting procedure on the network side and thus making it far more reliable.

An example of a continuous distribution function providing such probabilities is:

$$p(t) = x \cdot e^{xt}/(e^{xT}-1) \text{ for } t \in [0,T] \quad (1)$$

wherein p(t) denotes the probability that a delay time t is selected, T denotes the maximum delay time permitted, and x denotes a parameter that controls the rate of change of probability with time.

The parameters T and x are either known in the user equipments or may alternatively be signalled to the user equipments by the network with the page or control channel signalling.

An equivalent example for the case where the time interval T is sub-divided into n sub-intervals of equal lengths (e.g. UMTS transport time intervals) is:

$$p(j) = q^{n-j} \cdot (1-q)/(1-q^n) \text{ for } j \in [0,n] \quad (2)$$

wherein p(j) denotes the probability that sub-interval j is selected (j=1 denotes the shortest time delay), and q denotes a parameter that controls the rate of change of the probability with sub-interval.

The parameters T, n and q are either known in the user equipments or may alternatively be signalled to the user equipments by the network with the page or control channel signalling.

Where the time interval is divided into sub-intervals, the individual user equipment can decide which sub-interval it should transmit in by selecting a random number, r, which is uniformly distributed between 0 and 1. The value of r is compared successively with each of the values of P(j), where P(j) is the cumulative of the probability distribution. For the example distribution (2):

$$P(j) (q^{n-j}-q^n)/(1-q^n) \text{ for } j \in [1,n] \quad (3)$$

The user equipment should transmit on the contention access channel in the first time interval, j, for which r<P(j).

An alternative to the decision values P(j) being calculated in the user equipment would be for the values of P(j) to be transmitted at each sub-interval by the network using a common downlink signalling channel, which will be further discussed with reference to FIGS. 6 and 7.

Figure 2:
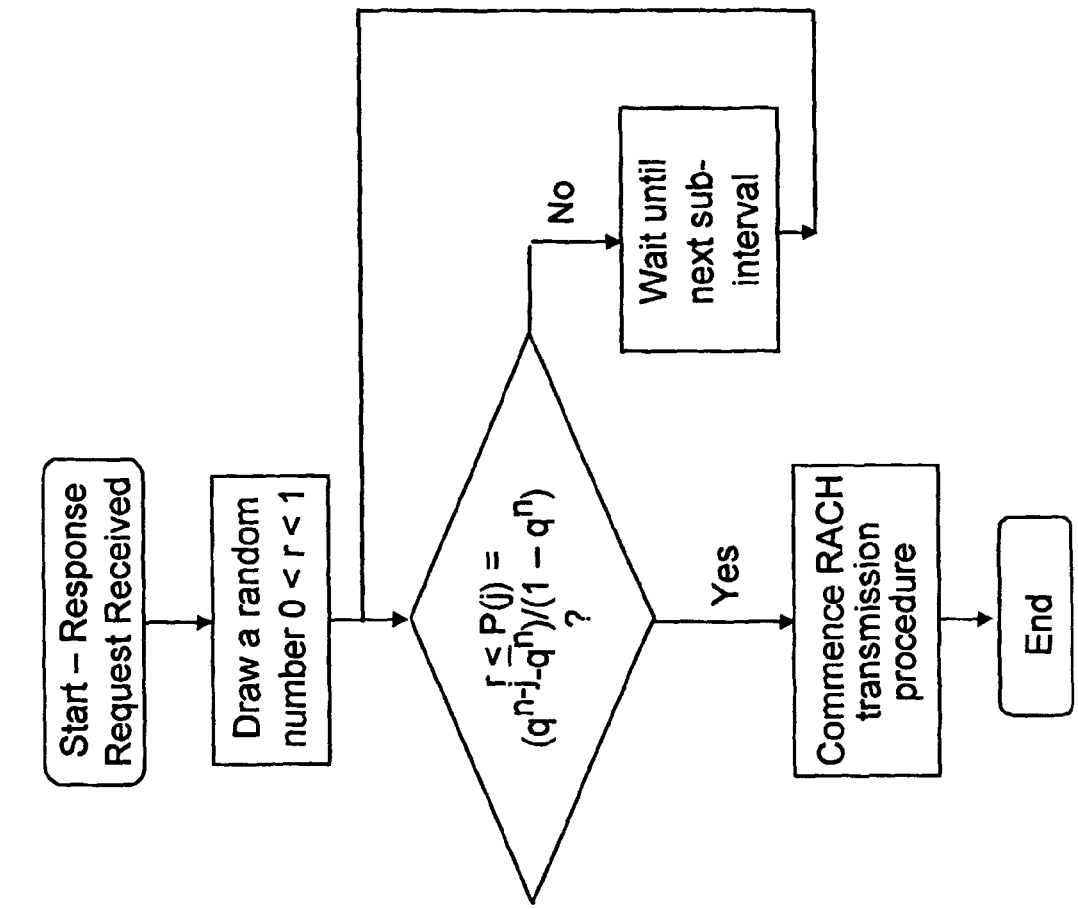
FIG. 2 shows a flow chart of the initial delay selection procedure.

FIG. 2 illustrates an example of a selection procedure proceeded in the user equipment for an initial RACH access delay when the cumulative probability distribution described by equation (3) is applied.

After having received the response request for establishing an MBMS service from the base station, the user equipment randomly determines a number r, which is consequently compared to the result of the probability distribution function of equation (3). In case r is equal or smaller than P(j), the user equipment starts to transmit signals in the RACH in order to inform the network of the presence or capabilities of the user equipment. In case r is greater than P(j), the subsequent sub-interval is awaited and a new comparison with P(j) made.

If the network detects that the number of user equipments responding to the request exceeds a threshold for which the response procedure is concluded, it signals to all user equipments in the cell to cease further uplink contention access transmissions in response to the page or control channel signalling. The network then establishes a single multicast radio bearer and activates the announced MBMS service.

The termination may be explicit, for example by transmitting a dedicated termination signal to all user equipments, or implicit, for example by signalling an allocation of resources for a multicast MBMS radio bearer which also indicates that the user equipment counting phase has been completed and that no further uplink common channel responses should be transmitted by user equipments with respect to this request.

In case the network receives less than the threshold number of responses within time interval T, it assumes that the number of user equipments interested in the announced MBMS service or possessing the particular characteristics for the service present in the cell equals the number of received responses and terminates the counting procedure. It then establishes individual radio bearers to each of the user equipments and subsequently establishes the MBMS service.

By the use of these procedures it is achieved that all user equipments responding to the page or control channel signalling will select a transmission delay that is at most T, which enables the network to receive responses within the time interval T. If less than the threshold number of user equipments present in the cell is required to respond to the request, all of them should be responding within this time interval T. The rate at which user equipments respond should increase as time increases towards T. Since the network counts the number of received responses and eventually terminates the transmission further responses when the threshold number is exceeded, a signalling overload on the uplink common channel, for example the RACH, is avoided.

Figure 3:
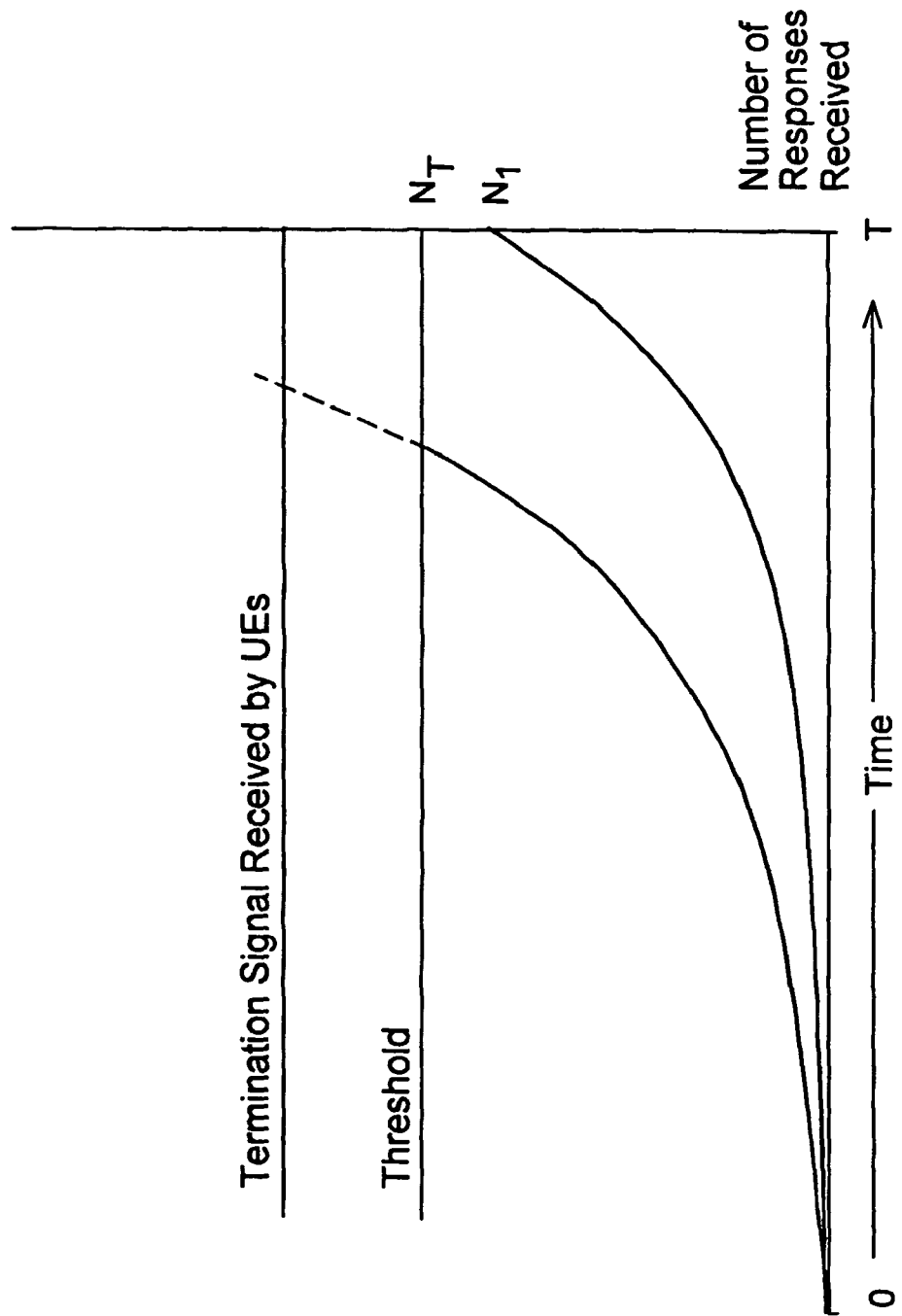
FIG. 3 shows an illustration of a threshold triggered termination of responses.

An example of the above described principles is shown in FIG. 3. When less than the threshold number NT of user equipments are present in the cell, all should commence the transmission procedure within time T, this is illustrated by the line ending at N1. If, in contrast, there are more than the threshold number NT of user equipments present in the cell, then further transmissions of the user equipments will be terminated when the threshold number NT is reached. Although signalling delays may result in a pluarlity of responses being received at the base station after the threshold number NT is reached, a selection of suitable access distribution parameters, for example x and T or q, n and T, should enable the termination of response transmissions in order to avoid signalling overload in the uplink contention access channel.

It is nevertheless possible that user equipments fail to receive respectively the paging or control channel signalling, or that the network fails to receive responses from user equipments. Different procedures may be used for alleviating the effects of such losses. According to a first procedure, the requests sent on paging or common channels are transmitted repeatedly in order to increase the likelihood that an user equipment will receive the request. Additionally, the magnitude of parameter T could be reduced with each successive request to ensure that user equipments responding to a later request initiate the transmission of responses before a common point in time. According to a second procedure, responses are retransmitted by user equipments if the user equipments transmission has not been acknowledged by the network within a period of time, provided that the completion of the counting procedure has not yet been signalled by the network. An identifier contained in the in the response of the user equipment could thereby be used by the network for acknowledgement. In such cases, the time interval in which the network expects to receive responses before assuming that all user equipments have responded may exceed T.

The method allows the network to control the user equipments' access to the contention based uplink access channel in a way that varies the density of response transmissions with time for a variable number of users in a cell. Furthermore, the method enables the network to terminate uplink response transmissions when a threshold number of responses has been received, thereby preventing signalling overload of the uplink signalling channel. The uplink control method also ensures that all addressed user equipments should attempt to respond within a defined time interval.

Figure 4:
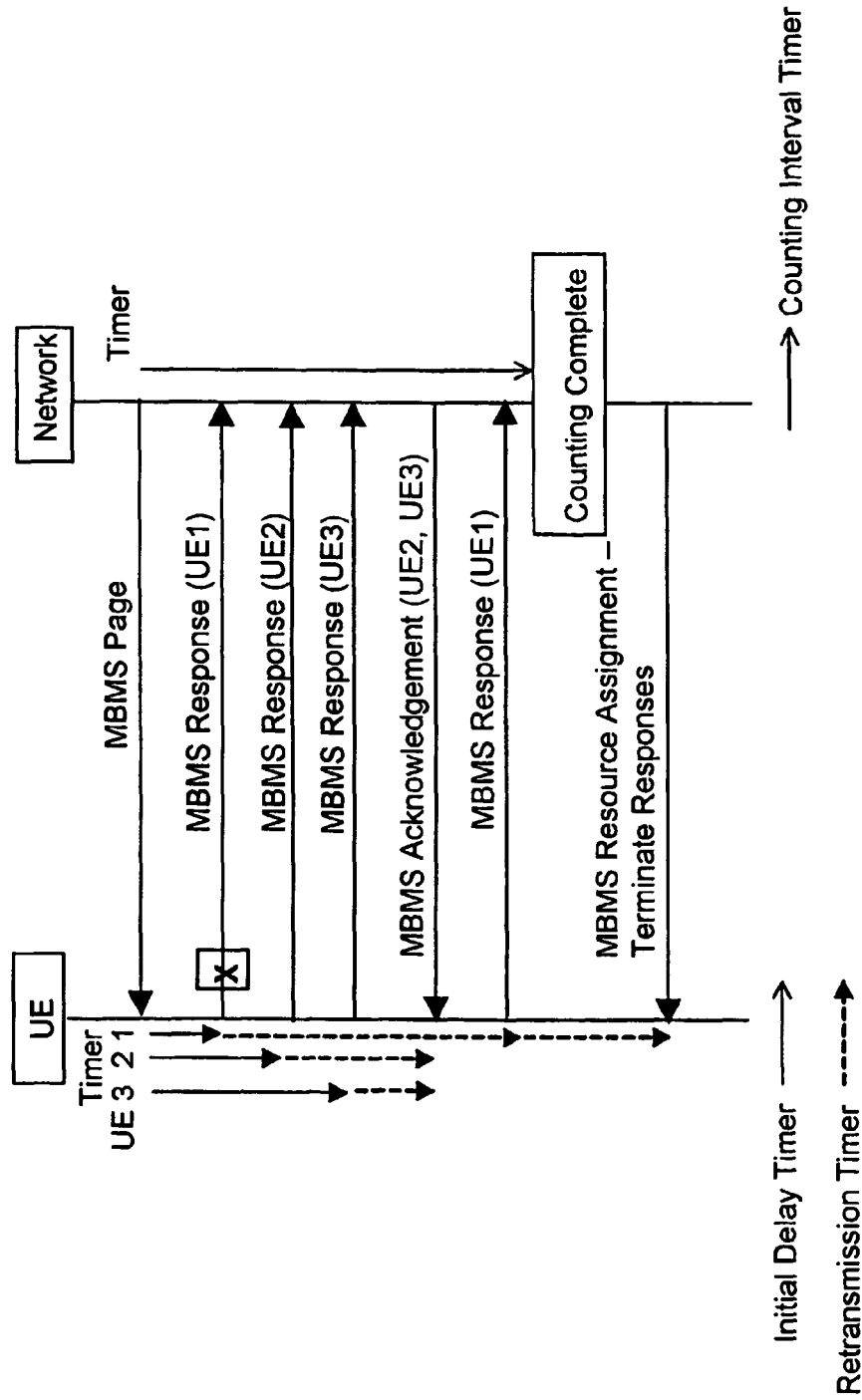
FIG. 4 shows a first message exchange chart.

FIG. 4 shows an example of a message sequence chart that illustrates the operation of the access control mechanism when less than the threshold number of user equipments is present in the cell, thereby making use of the described optional network acknowledgement and user equipment retransmission protocol.

After an initial transmission of a request MBMS page by the network to the user equipments UE1, UE2, UE3, for the establishment of a MBMS multicast service, the user equipments each respond to the request by transmitting a response message back to the network at different instances determined by using the principles described with respect to FIG. 2. In case of detected collisions, i.e. when not receiving an acknowledgement from the network, the user equipments would retransmit the responses after a determined retransmission interval (dashed line).

In the example shown, the response MBMS Response of user equipment UE1 is corrupted during the transmission and cannot be detected by the receiving network. The network thus acknowledges only the responses from user equipments UE2 and UE3 by transmitting an acknowledgement message containing indicators of user equipments UE2 and UE3. Failing to receive an acknowledgement from the network, user equipment UE1 retransmits the response message MBMS Response to the network before the lapse of the network time interval, which this time is received well by the network. In this example it is assumed that the threshold number of responses is greater than three. As the number of responses at the lapse of the network time interval is three, i.e. user equipments UE1, UE2 and UE3, the network transmits one or several messages indicating to the user equipments that no further responses should be sent (Terminate Responses), and that the service will be established on resources assigned by the network (Ressource Assignment). In this case, individual bearer to each of the user equipments UE1, UE2 and UE3 would be established instead of a single bearer.

Figure 5:
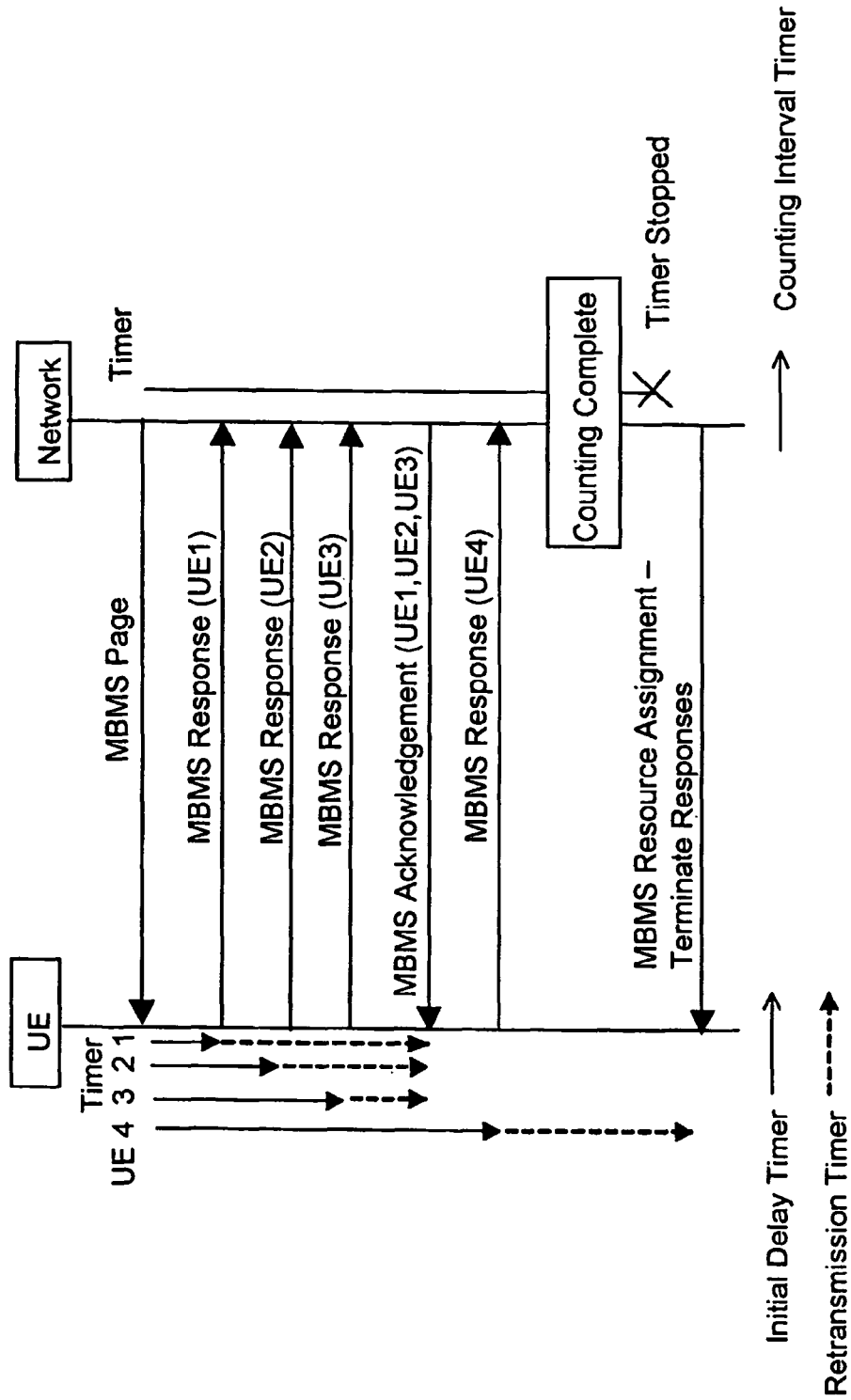
FIG. 5 shows a second message exchange chart.

In the example of FIG. 5, the responses of user equipments UE1, UE2 and UE3 are received and acknowledged by the network, and a fourth user equipment UE4 responds to the paging of the network. Because this time the number of responses exceeds the threshold before lapse of the timer interval, the network transmits messages for terminating the transmission of further responses from other user equipments, and for assigning a single MBMS bearer for all user equipments in the cell of the base station, even though not all potential user equipments replied to the request. The reception of the fourth user equipment's respond is not explicitly acknowledged by the network, instead, by receiving the resource assignment message, the UE4 knows that the respond was correctly received by the network.

Figure 6A:
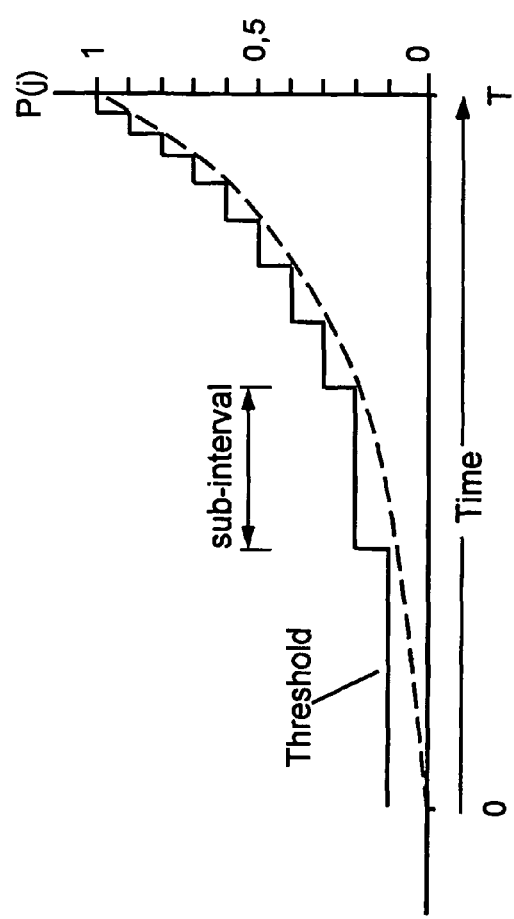
FIGS. 6a and b illustrate alternative time dependent variations of the threshold.
Figure 6B:
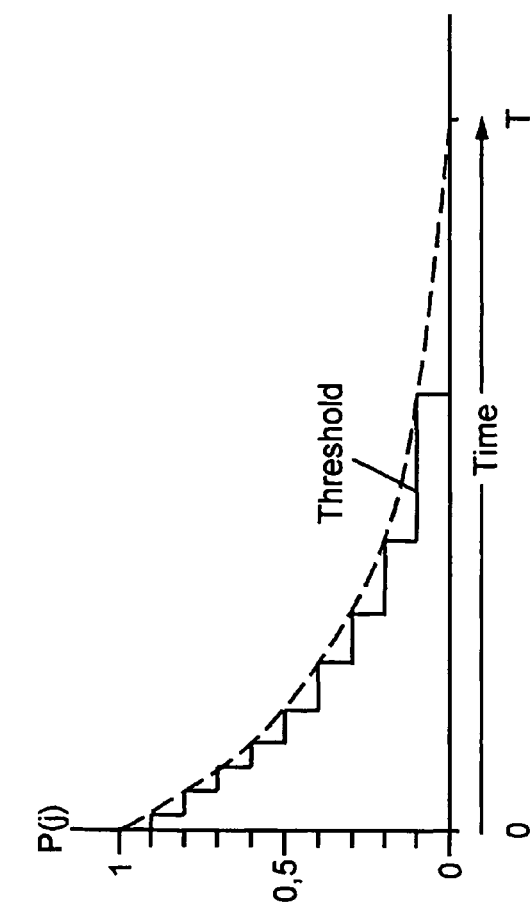

FIGS. 6a and 6b illustrate alternative variations of decision value P(j) of (3) within a time interval T. In the examples of FIGS. 6 and 7 it is furthermore assumed, that the decision value P(j) is determined in the network, for example in the base station or any other component of the communication system, and signalled in a downlink common signalling channel to the user equipments for comparison with randomly determined numbers r and thus controlling the timing of uplink response signalling in the user equipments.

The decision value P(j), which could also be seen as a threshold, changes from sub-interval to sub-interval within the given time interval T, wherein the distribution function of (3) leads to variable lengths of the sub-intervals (defined by the dashed line). In the example of FIG. 6a, the first threshold or value of P(j) is 0,1, which with respect to the flow chart in FIG. 7 leads to the result, that only user terminals with a random number r smaller than or equal to 0,1 are allowed to transmit responses to the received request during the first sub-interval. The first interval is substantially longer than the subsequent sub-intervals in order to enable to reach the threshold number of user equipment required for establishing a common MBMS bearer quickly. When advancing in time, with each new greater P(j) value the sub-intervals get shorter because a potentially greater number of user terminals are allowed to transmit responses in the sub-interval.

FIG. 6b shows a different approach for controlling the distribution of response transmissions from user equipments. In this case, the decision value P(j) starts at 0,9, and only user equipments having drawn a random number r equal to or greater than 0,9 are allowed to transmit responses within the first sub-interval. In contrast to the example of FIG. 6a, the length of the individual sub-intervals increases with time, which has the advantage, that because only a small number of user terminals are allowed to transmit in the first sub-interval, the risk of collisions is quite low, whereas larger numbers of user equipments allowed to transmit responses may also use longer sub-intervals.

Figure 7:
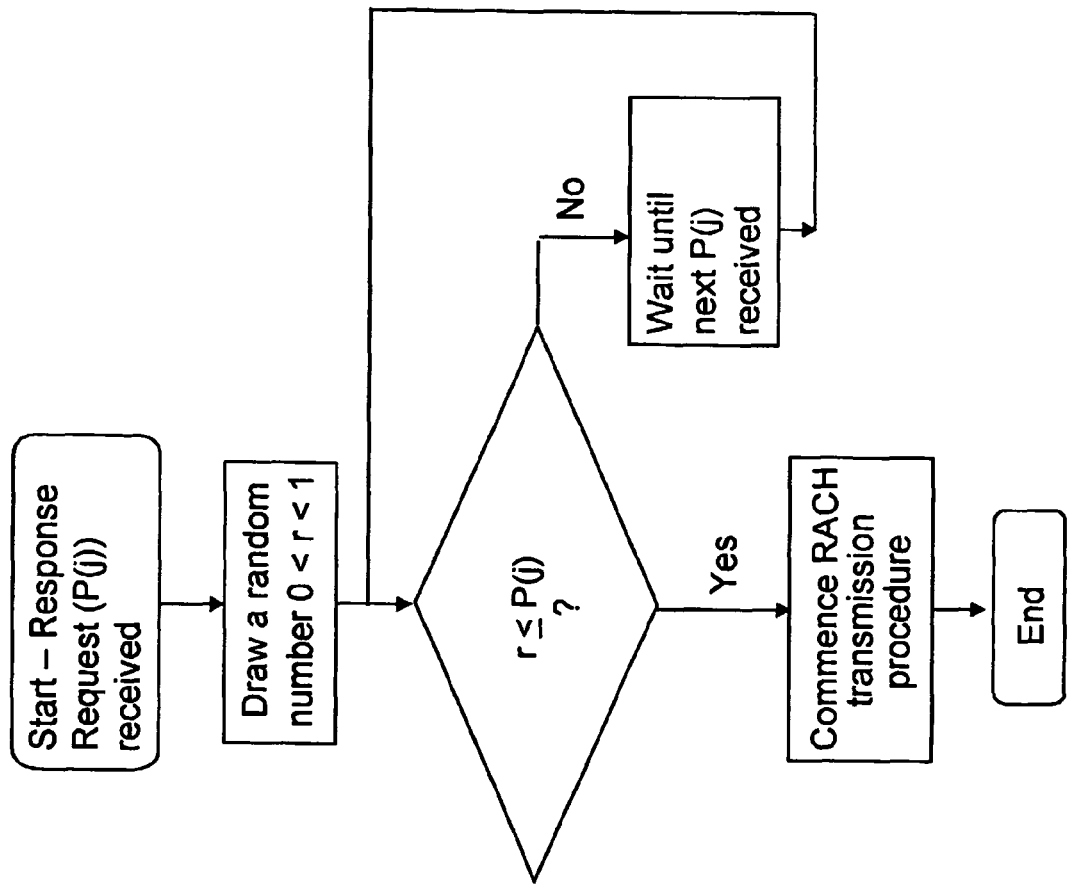
FIG. 7 shows a flow chart of the initial delay determination procedure based on the time variable threshold of FIG. 6.

FIG. 7 illustrates an example of the procedure in the user equipment to determine the time for initiating the RACH access based on decision values P(j) received from the network.

After having received the response request for establishing an MBMS service from the base station, the user equipment randomly determines a number r, which is consequently compared with the received decision value P(j). Alternatively, the decision value P(j) is not transmitted together with the response request, but instead is already known as a start value (0,1 according to FIG. 6a, or 0,9 according to FIG. 6b) in the user terminal. Referring to the example of FIG. 6a, in case r is equal or smaller than P(j), the user equipment starts to transmit signals in the RACH in order to inform the network of its presence or of the required property. In case r is greater than P(j), the reception of a subsequent decision value P(j) for the next sub-interval is awaited and a new comparison with P(j) made.

By ceasing the transmission of new decision values, further response transmissions from the user equipments could be stopped by the network.

As an alternative to the signalling of each of the decision values P(j) for each sub-interval, the network might also transmit the function, on which respectively the calculation of P(j) or the lengths of the individual sub-intervals are based, to the user terminals, and the comparison is done autonomously in the user equipments.

The invention has been described in detail with particular reference to preferred embodiments thereof and examples, but it will be understood that variations and modifications can be effected within the spirit and scope of invention covered by the claims which may include the phrase "at least one of A, B and C" or a similar phrase as an alternative expression that means one or more of A, B and C may be used, contrary to the holding in *Superguide v. DIRECTV*, 69 USPQ2d 1865 (Fed. Cir. 2004).

The invention claimed is:

1. A method for controlling uplink access transmissions in a radio communication system, comprising:
   a base station associated with the radio communication network issues a request,
   determining a random delay time for user equipment to transmit a signal on an uplink access channel based upon a probability distribution that increases in density with increasing delay, the random delay time being determined by the user equipment,
   after the determined delay time, the user equipment performs an uplink access transmission as a response to the request,
   wherein dependent on the number of user equipments responding to the request, the network either assigns common resources for at least a plurality of the user equipments or assigns individual resources for each user equipment.

2. The method according to claim 1, wherein
the delay time is determined upon receipt of a request for uplink access transmissions from a base station.

3. The method according to claim 2, wherein
the base station transmits the request on a paging channel or on a control channel.

4. The method according to claim 3, wherein
the signal for which the delay time is determined is a response signal transmitted by the user equipment on a contention based common uplink access channel.

5. The method according to claim 1, wherein
the signal for which the delay time is determined is a response signal transmitted by the user equipment on a contention based common uplink access channel.

6. The method according to claim 1, wherein the probability distribution is determined according to:

$$p(t) = x \cdot e^{xt}/(e^{xT}-1) \text{ for } t \in [0,T]$$

wherein p(t) denotes a probability that a delay time t is selected, T denotes a predetermined maximum delay time, and x is a parameter that controls a rate of change of probability with time.

7. The method according to claim 6, wherein T and x are signalled to the user equipment.

8. The method according to claim 7, wherein T and x are transmitted together with a request for the delay time from the base station.

9. The method according to 1, wherein the probability distribution is determined according to:

$$p(j) = q^{n-j} \cdot (1-q)/(1-q^n) \text{ for } j \in [0,n]$$

wherein n is the number of sub-intervals in a predetermined time interval T, P(j) denotes a probability that sub-interval j is selected, and q is a parameter that controls a rate of change of probability within a sub-interval.

10. The method according to claim 1, wherein the probability distribution is determined according to:

$$P(j) = (q^{n-j}-q^n)/(1-q^n) \text{ for } j \in [1,n]$$

wherein n is the number of sub-intervals in a predetermined time interval T, P(j) denotes a probability that sub-interval j is selected, and q is a parameter that controls a rate of change of probability within a sub-interval.

11. The method according to claim 1, wherein
the network determines if the number of user equipments responding to the request exceeds a predetermined threshold, and
the network signals to the user equipments to terminate further uplink access transmissions if the threshold is exceeded.

12. The method according to claim 11, wherein
to signal the user equipments to terminate further uplink transmissions, the network transmits a dedicated termination signal to the user equipments, or signals an allocation of resources that implicitly indicates termination is required.

13. The method according to claim 1, wherein
the probability distribution is determined according to:

$$p(t) = x \cdot e^{xt}/(e^{xT}-1) \text{ for } t \in [0,T]$$

wherein p(t) denotes a probability that a delay time t is selected, T denotes a predetermined maximum delay time, and x is a parameter that controls a rate of change of probability with time.

14. The method according to 13, wherein
the probability distribution is determined according to:

$$p(j) = q^{n-j} \cdot (1-q)/1-q^n) \text{ for } j \in [0,n]$$

wherein n is the number of sub-intervals in a predetermined time interval T, P(j) denotes a probability that sub-interval j is selected, and q is a parameter that controls a rate of change of probability within a sub-interval.

15. The method according to claim 13, wherein the probability distribution is determined according to:

$$P(j)=(q^{n-j}-q^n)/1-q^n) \text{ for } j\in[1,n]$$

wherein n is the number of sub-intervals in a predetermined time interval T, P(j) denotes a probability that sub-interval j is selected, and q is a parameter that controls a rate of change of probability within a sub-interval.

16. A method for controlling uplink access transmissions in a radio communication system, comprising:
   a base station associated with the radio communication network issues a request,
   using downlink signaling from a base station of the radio communication system to transmit time variable information to user equipments in an area covered by the base station, using the time variable information to determine delay times for transmitting uplink access transmissions on an uplink access channel from the user equipments in response to the request, the time variable information varying based upon a probability distribution which increases in density with increasing time,
   assigning, by the network, dependent on the number of user equipments responding to the request, either common resources for at least a plurality of the user equipments or assigns individual resources for each user equipment.

17. The method according to claim 16, wherein
   the user equipments each perform a comparison of a randomly determined number with the time variable information, and
   based on the result of the comparison, each user equipment controls the transmission of said signals on the uplink access channel.

18. A base station of a radio communication system, comprising:
   a transmitter to issue a request and to transmit a time variable information in downlink to user equipments located in an area covered by the base station, wherein the information is used in the user equipments to determine delay times for transmitting signals on an uplink access channel in response to the request and wherein the information varies based upon a probability distribution which increases in density with increasing time; and
   a receiver to receive the signals transmitted by the user equipments on the uplink access channel,
   wherein dependent on the number of user equipments responding to the request, the network the base station with is associated either assigns common resources for at least a plurality of the user equipments or assigns individual resources for each user equipment.

19. A user equipment of a radio communication system, comprising a calculation unit to determine a delay time for transmitting a signal on an uplink access channel in response to a request issued by a base station, wherein the delay time is randomly determined based upon a probability distribution that increases in density with increasing delay,
   wherein the network associated with the base station, dependent on the number of user equipments responding to the request, either assigns common resources for at least a plurality of the user equipments or assigns individual resources for each user equipment.

20. A user equipment of a radio communication system, comprising:
   a receiver to receive a request and a time variable information in downlink from a base station of the radio communication system, wherein the information is used to determine delay times for transmitting signals on an uplink access channel and wherein the information varies based upon a probability distribution which increases in density with increasing time; and
   a transmitter to transmit the signals on the uplink access channel to the base station,
   wherein the network associated with the base station, dependent on the number of user equipments responding to the request, either assigns common resources for at least a plurality of the user equipments or assigns individual resources for each user equipment.

* * * * *